United States Patent
Bowater et al.

(10) Patent No.: US 6,282,269 B1
(45) Date of Patent: Aug. 28, 2001

(54) VOICE MAIL ON THE INTERNET

(75) Inventors: Ronald John Bowater, Romsey; Lawrence Leon Porter, Lyndhurst, both of (GB)

(73) Assignee: International Business Machines Corp., Armonk, NY (US)

(*) Notice: Subject to any disclaimer, the term of this patent is extended or adjusted under 35 U.S.C. 154(b) by 0 days.

(21) Appl. No.: 08/763,156

(22) Filed: Dec. 10, 1996

(30) Foreign Application Priority Data

Mar. 5, 1996 (GB) .................................................. 9604667

(51) Int. Cl.⁷ .............................. H04M 1/64; H04L 12/56
(52) U.S. Cl. ................. 379/88.17; 379/67.1; 379/88.12; 379/88.25; 379/908; 370/352; 370/356
(58) Field of Search ................................. 379/67, 88, 89, 379/90.01, 93.01, 93.05, 93.09, 100.15, 100.16, 67.1, 88.13, 88.14, 88.15, 93.24, 100.08, 900, 902, 908, 70, 88.17, 88.12, 88.18, 88.22, 88.25; 370/352, 353, 380, 389, 392, 396, 401, 404, 427, 435, 450, 465, 485, 356

(56) References Cited

U.S. PATENT DOCUMENTS

| | | | |
|---|---|---|---|
| 4,771,425 | * 9/1988 | Baran et al. | 370/85 |
| 5,027,384 | * 6/1991 | Morganstein | 379/67 |
| 5,526,353 | * 6/1996 | Henley et al. | 370/60.1 |
| 5,583,920 | * 12/1996 | Wheeler, Jr. | 379/88 |
| 5,608,786 | * 3/1997 | Gordon | 379/100 |
| 5,651,054 | * 7/1997 | Dunn et al. | 379/67.1 |
| 5,675,507 | * 10/1997 | Bobo, II | 364/514 R |
| 6,018,704 | * 8/2000 | Hutton et al. | 709/227 |

FOREIGN PATENT DOCUMENTS

| | | | |
|---|---|---|---|
| 0367455 | 5/1990 | (EP) | H04Q/3/62 |
| 9214314A | 8/1992 | (WO) | H04J/3/00 |
| 9619068A | 6/1996 | (WO) | H04M/1/64 |
| 9620553A | 7/1996 | (WO) | H40M/3/50 |

OTHER PUBLICATIONS

Patent application serial No. 08/595897 (docket #YO9-96-021) entitled: "Multipoint Simultaneous Voice and Data Services Using a Media Splitter Gateway Architecture", filed Feb. 6, 1996, IBM Corporation, Yorktown Heights, New York.

(List continued on next page.)

Primary Examiner—Allan Hoosain
(74) Attorney, Agent, or Firm—Jeanine S. Ray-Yarletts (57) ABSTRACT

A first Internet telephone system 620 attempts to call with a second Internet telephone system 630 via the Internet 600. However, the second Internet telephone system 630 is not logged onto the Internet at the time of the call. In response to the failed attempt to call, the first Internet telephone system prompts the user to send voice mail to the user of the second Internet telephone system. This results in a phone call over the Internet between a voice mail system 610 and the first Internet telephone system, allowing a greeting to be heard, and a message to be stored. This message may be subsequently retrieved, either using an Internet telephone system over the Internet, or using a standard phone over the conventional telephone network.

21 Claims, 3 Drawing Sheets

OTHER PUBLICATIONS

Terry et al, 'Managing Stored Voice in the Etherphone System', 1988, ACM Transactions on Computer Science, vol. 6, No. 1 pp. 3–27.

N S Borenstein, 'Internet Multimedia Mail with MIME: Emerging Standards for Interoperability', 1992, Elsevier Science Publishers, IFIP transactions C, vol. C–7, pp. 183–192.

Reynolds et al, 'The DARPA Experimental Multimedia Mail System', 1985, IEEE, Computer, vol. 18, No. 10, pp. 82–89.

J Rowley, 'Making the Internet Pay', Nov. 1995, Managing Information, vol. 2, No. 11, pp. 36–37.

'Dial 1–800–Internet' article in Byte Magazine, Feb. 1996, pp. 83–88.

'Nattering On' article in New Scientist, Mar. 2, 1996, pp. 38–40.

"Workstation Communications System" IBM Technical Disclosure Bulletin, US, IBM, Corp. New York, vol. 37, No. 9, pp. 101–104 XP000473347 ISSN: 0018–8689.

Walker B: "Paving the Way for A Paperless Empire" Network Week, GB, APT Data Services, London, vol. 1, No. 42, pp. 29–30 XPoo0618808 ISSN: 0965–3031.

\* cited by examiner

VOICE MAIL ON THE INTERNET

TECHNICAL FIELD

The present invention relates to voice mail systems for use over the Internet.

BACKGROUND OF THE INVENTION

Conventional voice mail systems (also termed voice messaging systems) attach to the telephone network, often via a PBX, and are used to store messages from incoming calls when the intended recipient is absent or otherwise engaged. The intended recipient can then listen to their stored messages at some future time. A voice mail system is generally implemented either on special purpose computer hardware, or else on a standard computer workstation equipped with a suitable telephony interface. Such voice mail systems are well-known; one example is the DirectTalkMail system, available from IBM Corporation, which operates in conjunction with the DirectTalk/6000 voice processing system (also available from IBM). Other examples of voice mail systems are described in U.S. Pat. No. 5,136,648 and EPA 0588576.

Also known are electronic mail systems (email), which allow the transmission of text messages over a computer network. The most prominent such network over the last couple of years is the Internet, which provides a readily accessible, worldwide network for packet-based communications. Background information about the Internet and the World Wide Web can be found in "Spinning the Web" by Andrew Ford (International Thomson Publishing, London 1995) and "The World Wide Web Unleashed" by John December and Neil Randall (SAMS Publishing, Indianapolis 1994).

Although originally intended primarily for the transmission of computer data, more recently the Internet has been exploited to provide real-time telephony communications. The primary attraction of the Internet for telephony communications is the charging structure. Thus many Internet users have a dial-up connection to an access provider. This is normally over a local telephone line, so such users pay only local telephone charges when logged on. Some access providers charge a monthly description, whilst others charge on the basis of connection time (some may do both). However, there is generally no charge associated with actual data transfer over the network. As a result, the effective cost of an international call over the Internet may be no more than that of a local call of the same duration to the access provider. In addition, the fully digital nature of the Internet may potentially offer a richer functionality (eg in terms of conference calling) than conventional telephone networks. Internet telephones are surveyed in the article "Dial 1-800-Internet" in Byte Magazine, February 1996, p83–88, and in the article "Nattering On", in New Scientist, Mar. 2, 1996, p38–40.

The transmission of voice signals over a packet network is described for example in "Using Local Area Networks for Carrying Online Voice" by D Cohen, pages 13–21, in "Voice Transmission over an Ethernet Backbone" by P Ravasio, R Marcogliese, and R Novarese, pages 39–65, both in "Local Computer Networks" (edited by P Ravasio, G Hopkins, and N Naffah; North Holland, 1982) and also in GB 2283152. The basic principles of such a scheme are that a first terminal or workstation digitally samples a voice input signal at a regular rate (eg 8 kHz). A number of samples are then assembled into a data packet for transmission over the network to a second terminal, which then feeds the samples to a loudspeaker or equivalent device for playout, again at a constant 8 kHz rate. Voice transmission over the Internet is substantially similar to transmission over a LAN (which may indeed provide part of the Internet transmission path), but there tends to be less spare bandwidth available on the Internet. As a result, Internet telephones normally compress the voice signal at the transmitting end, and then decompress it at the receiving end.

There are several well-known problems with packet-based voice communications. Firstly, there is a transmission delay over the network, which is variable, depending particularly on the utilisation of the network by other nodes at any given time. Thus the arrival of packets at a destination node is both delayed and irregular. If the packets were played out in irregular fashion, this would have an extremely adverse effect on intelligibility of the voice signal. Therefore, packet voice transmissions utilise some degree of buffering at the reception end, to absorb such irregularities. Such buffering however increases the delay between the original voice signal and the audio output at the destination end. This delay may cause problems with echos, and more importantly, can render natural interactive two-way conversation difficult (in the same way that an excessive delay on a transatlantic conventional phone call can be highly intrusive). Yet further delays are introduced by the necessity to compress/decompress the voice signal.

Some Internet telephones which are currently commercially available provide a voice mail facility, whereby the calling party can leave a message if the called party does not answer. This is somewhat analogous to the conventional answerphone. Note that such systems are limited in that generally the called party is required to be logged onto the Internet to receive a voice message. However, many users with dial-up Internet access via a modem have to pay on a time basis for a telephone call into their Internet access provider, and moreover some Internet access providers charge for connections on a time basis. Therefore most users log off from the Internet when they are not using it to avoid incurring excessive charges. In such circumstances, this implies that they are no longer able to receive a voice message.

It would of course be possible for a user to transmit a voice message in the form of a normal email (data) message to another user who is not currently logged on. The message is then queued at the Internet access provider's site for delivery at next logon by the relevant user. However, generally this approach offers few benefits over simply sending an email message, rather than the voice message.

It is an object of the invention to provide improved voice mail facilities for the users of Internet telephones.

SUMMARY OF THE INVENTION

Accordingly, the invention provides a method of providing voice mail on the Internet comprising the steps of:

selecting to make a call from a first user at a first Internet telephone system to a second user at a second Internet telephone system;

determining that said second Internet telephone system is not currently logged onto the Internet to receive said call; and transmitting a voice message for said second user over the Internet to a voice mail system distinct from said second Internet telephone system for subsequent retrieval by said second user.

The voice mail service is therefore available when the first user cannot directly contact the second user. This may be determined as a result of actually trying to place a call to the second user, or perhaps simply by viewing the list of currently accessible parties. The voice mail system is distinct from the second Internet telephone system, and is intended to be continuously attached to the Internet. The voice mail system is therefore available when the second Internet telephone system is not logged onto the Internet, thereby avoiding the subscriber of this second system having to pay overly high Internet connection or usage charges.

In a preferred embodiment, responsive to a determination that the second Internet telephone system is not currently logged onto the Internet, the first user at the first Internet telephone system is offered a choice of whether or not to leave a voice message for the second user. Typically this choice is generated locally at the calling Internet telephone, although it may be generated at some intermediate server in the network, which is used for routing and placing calls. Assuming that the option to leave voice mail is accepted, a communications link is established over the Internet between the first Internet telephone system and the voice mail system in order to transmit the voice message for said second user. Said communications link permits two-way communications, and the voice mail system transmits to the first user one or more prompts or greetings prior to transmission of the message for the second user to the voice mail system. Typically, said one or more prompts or greetings include information concerning the current location and availability of the second user.

In the preferred embodiment, said voice message can be retrieved by the second user either using an Internet telephone over the Internet, or by using a conventional telephone over the conventional phone network. It is generally most convenient if substantially the same prompts and/or greetings are heard irrespective of whether the voice mail system is accessed by the conventional telephone network or over the Internet, since a subscriber is then only required to keep a single set of prompts/greetings up-to-date. Note that one of the advantages of the invention is that any voice mail stored in the voice mail system can be immediately available for retrieval by the mailbox owner, either by calling the voice mail system by telephone, or by Internet access (not necessarily via the mailbox owner's normal access provider).

Preferably the method further comprises the step of the voice mail system providing said second user of said second Internet telephone with an indication that he or she has a voice mail message waiting next time said second user logs on to the Internet using an Internet telephone. This indication may be provided in response to a request from the Internet telephone, which is transmitted from the Internet telephone to the voice mail system at start-up time.

It is also preferred that this indication is provided irrespective of whether said voice mail message was received over the Internet or over the conventional telephone network. This emphasises one of the important aspects of the invention, namely that a subscriber should only need one voice mail service, and the distinction between the Internet and the conventional telephone network should be essentially transparent to the subscriber.

The invention also provides a telephone system for making a telephone call over the Internet, including:
  means for allowing a first user at said system to select a second user at a second Internet telephone system to call;
  means for determining that said second Internet telephone system is not currently logged onto the Internet to receive said call; and
  means for transmitting a voice message for said second user over the Internet to a voice mail system distinct from said second Internet telephone system for subsequent retrieval by said second user.

The telephone system will typically include means for displaying one or more prompts or greetings to said first user in textual or graphical form, although usage of this facility may be somewhat restricted in order to maintain conformity between the access mechanisms over the Internet and over the conventional telephone network.

The invention further provides a voice mail system including:
  means for receiving a voice message over the Internet;
  means for storing said voice message;
  means for allowing said message to be retrieved over the Internet; and means for allowing said message to be retrieved over the conventional telephone network.

In a preferred embodiment, the voice mail system further comprises means for transmitting one or more prompts or greetings prior to receipt or retrieval of a voice message over the Internet. Generally said one or more prompts or greetings transmitted prior to receipt of a voice message over the Internet may include information concerning the current location and availability of the intended message recipient.

It is preferred that the voice mail system includes means for receiving a voice message over the conventional telephone network, which can then be accessed and processed in the same manner as messages received over the Internet. Thus a message received over either the Internet or the conventional telephone network can be retrieved over either the Internet or the conventional telephone network without restriction. Further in this vein, preferably there are means for providing an indication to a subscriber that he or she has one or more voice mail messages waiting, and this indication includes both voice messages received over the Internet, and voice messages received over the conventional telephone network.

In the preferred embodiment, said means for receiving a voice message over the Internet includes means for receiving a voice signal in compressed form split into a plurality of packets, and means for assembling the voice signal and decompressing it into said voice message; and said means for allowing a voice message to be retrieved over the Internet includes means for compressing the message and packetising it prior to transmission over the Internet.

BRIEF DESCRIPTION OF THE DRAWINGS

Preferred embodiments of the invention will now be described by way of example only, with reference to the following drawings.

DETAILED DESCRIPTION OF THE PREFERRED EMBODIMENT

Figure 1:
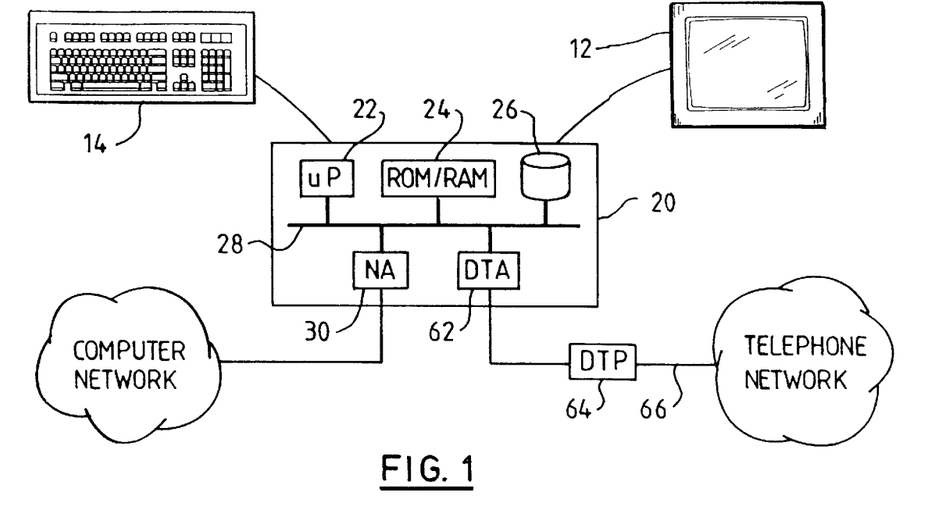
FIG. 1 is a schematic diagram of a voice mail system.

FIG. 1 is a simplified diagram of a voice mail system based on a conventional computer workstation comprising system unit 20, display screen 12, and keyboard 14. The system unit includes a microprocessor 22, ROM/RAM 24, and disk storage 26, connected together via bus 28. In order to operate as a voice mail unit, the computer workstation is connected to telephone line 66 via a digital trunk processor 64 and a digital trunk adapter card 62. The voice mail system also includes a network adapter card 30 to connect the voice mail system to a computer network (eg a LAN). The voice mail system may also include other known components, such as an audio capture/playback card, a CD-ROM and mouse (not shown).

The voice mail system illustrated in FIG. 1 is based on the DirectTalk/6000 voice processing system, available from IBM Corporation. The hardware components of this system are an RISC System/6000 computer workstation, plus the digital trunk processor and digital trunk adapter. The DirectTalk/6000 system connects to the telephone network through a T1 or E1 digital trunk line 66 (and via a PBX in most installations). The digital trunk processor is used to demultiplex incoming signals and multiplex outgoing signals on the trunk line, and perform log-linear conversion as appropriate. The digital trunk processor is also used to perform compression/decompression. The digital trunk adapter effectively acts as an interface between the workstation itself and the digital trunk processor. Further details about the DirectTalk/6000 voice processing system can be found in the manual "IBM AIX DirectTalk/6000, General Information and Planning" (publication number GC33-1720-00) and the other manuals referenced therein.

Figure 2:
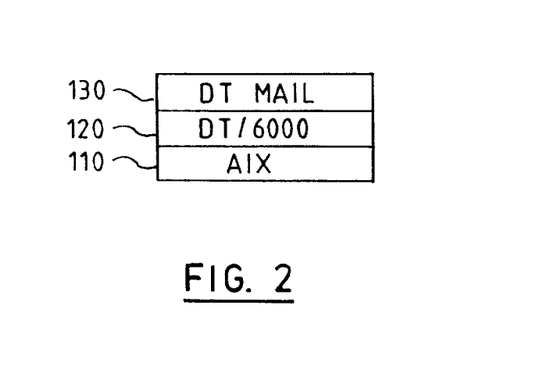
FIG. 2 is a schematic diagram of the prior art arrangement of software running on the voice mail system.

FIG. 2 is a simple block diagram of the main software components running on the voice mail system of FIG. 1. Running on the RISC System/6000 workstation is first of all the operating system for the workstation, which in the present case is AIX 110, and then the DirectTalk/6000 software 120 itself. The latter includes a device driver for the telephony hardware (the digital trunk adapter). Also on the RISC System/6000 workstation, effectively running as an application on top of the DirectTalk/6000 system, is DirectTalkMail 130, which provides standard voice messaging capabilities.

It will be appreciated that voice mail systems such as that illustrated in FIGS. 1 and 2 are well-known, and that many variations on the system illustrated are also well-known. For example, there are many systems in which telephone line 66 is analog, in which case the digital trunk processor is often omitted, and its functions performed, where appropriate by a suitable telephony adapter card. The precise hardware configuration employed in the voice mail system is not relevant to an understanding of the present invention, and so will not be discussed further.

The DirectTalkMail voice messaging system itself can be considered as a form of voice database system, based on mailboxes. Thus each user or subscriber has a mailbox, which has associated with it all the information for that user, eg their extension number, their password, the number of new messages that they have, their current greeting, and so on. The mailbox also logically contains the digitised stored messages for that user (although physically the audio recording may be stored in a different location from the other information). Each mailbox has a unique identifier, such as a number or name, for example, each mailbox can be allocated the extension number of the user associated with that mailbox. The DirectTalkMail voice messaging system also contains routines to allow callers to telephone messages into the database and subscribers to extract messages from the database for listening over the telephone, as well as other functions such as forwarding messages. The operation of a voice mail system in such a manner is well-known and so will not be described further.

Figure 3:
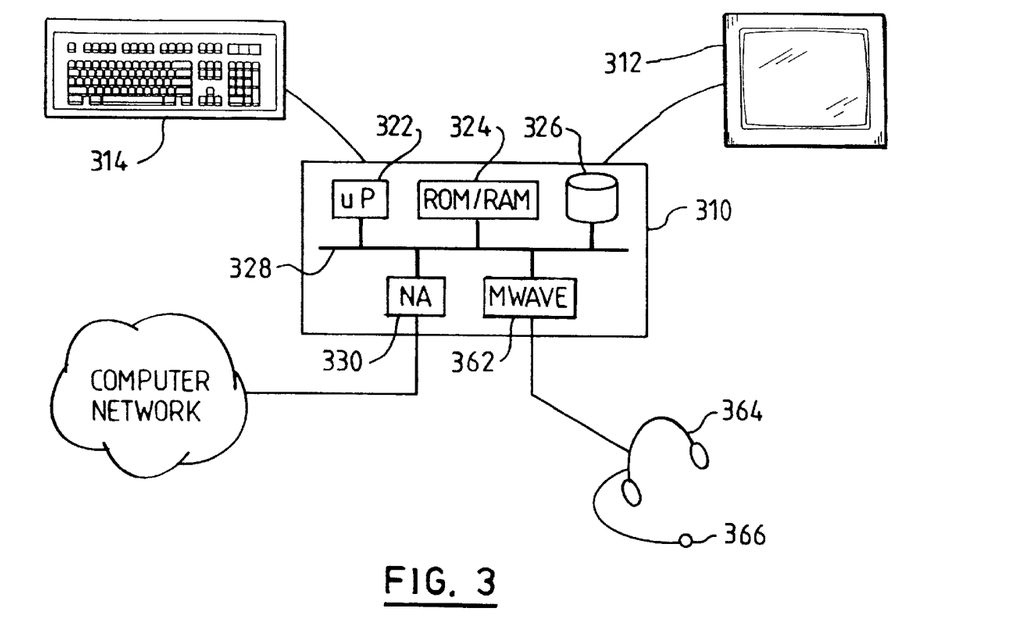
FIG. 3 is a schematic diagram of an Internet telephone system.

FIG. 3 is a simplified schematic diagram of a client computer system which may be used for telephone transmission over the Internet. The computer workstation of FIG. 3, which is similar to that of FIG. 1, but generally less powerful, has a system unit 310 including microprocessor 322, semi-conductor memory (ROM/RAM) 324, hard disk 326, and a bus over which data is transferred 328. Other typical components of the computer are a display 312, keyboard 314, and mouse (not shown). The computer of FIG. 3 may be any conventional workstation, such as an Aptiva computer, available from IBM Corporation. Alternatively, any other form of suitable Internet access device, including the new generation of low-cost systems (effectively sub-PCs) which are currently being developed may be employed instead as the client telephone terminal.

The computer of FIG. 3 is equipped with two adapter cards. The first of these is a network adapter card 330. This card, together with accompanying software such as the TCP/IP communications stack, allows messages to be transmitted onto and received from a computer network such as a Local Area Network (LAN). In this case, it is presumed that the Internet is accessed via the LAN. Alternatively (or additionally), the computer of FIG. 3 may have a modem (not shown), installed either internally as another adapter card, or externally, for example via the RS-232 serial port. The modem in turn can be connected to a telephone socket, allowing dial-up access to an Internet provider. The operation of a network adapter card or modem to provide Internet access is wellknown, and so again will not be described in detail.

The second card shown in FIG. 3 is an audio card 362 which is connected to a headset including microphone 366 and earphones 364 for audio input and output respectively (alternatively the computer in FIG. 3 may have a loudspeaker, and built-in microphone, but the use of a headset is preferred to optimise the quality of the audio signal produced and actually heard).

Figure 4:
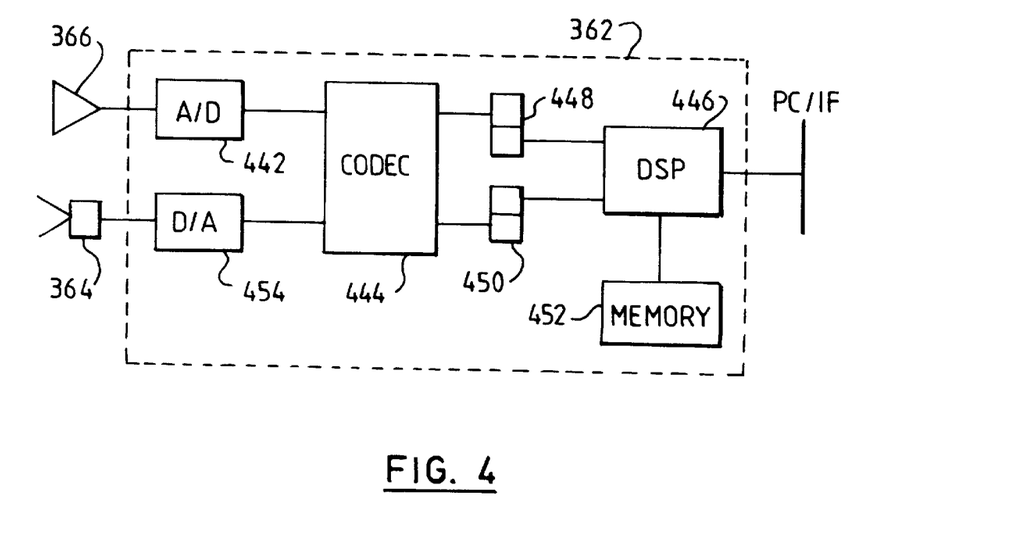
FIG. 4 is a schematic diagram of the audio processing components on the audio adapter card of the Internet telephone system of FIG. 3.

The audio card is shown in more detail in FIG. 4. The card illustrated and used in the preferred embodiment is an M-Wave card available from IBM Corporation, although other cards are commercially available that perform an analogous function. The card 362 contains an A/D converter 442 to digitise incoming audio signals from the attached microphone 366. The A/D converter is attached to a codec 444, which samples the incoming audio signal into samples (eg 8 bit or 16 bit). Digitised samples are then passed to a digital signal processor (DSP) 446 on the card via a buffer 448 where they are compressed. The DSP is controlled by one or more programs stored in semiconductor memory 452 on the card. Data can be transferred by the DSP to and from the main PC bus.

Audio signals to be played out are received by the DSP 446 from the PC bus 328, and processed in a converse fashion to incoming audio. That is, the output audio signals are passed through the DSP 446 for decompression, and then through buffer 450 to the codec 444, from there to a D/A converter 454, and finally to a loudspeaker 364 or other appropriate output device.

There are various compression/decompression techniques that are available for audio communication over the Internet.

The preferred embodiment uses a modified version of GSM, which is the standard compression technique used in Europe for cellular phones, to provide voice compression. Another possible technique to use is the DigiTalk system developed by Rockwell Communications. Such technologies as these reduce the bandwidth requirements for voice communications to less than 10 kbits per second. Note that although the embodiment shown in FIG. 4 performs the compression/decompression on a DSP, in other embodiments this processing may be performed purely in software on the host computer.

Figure 5:
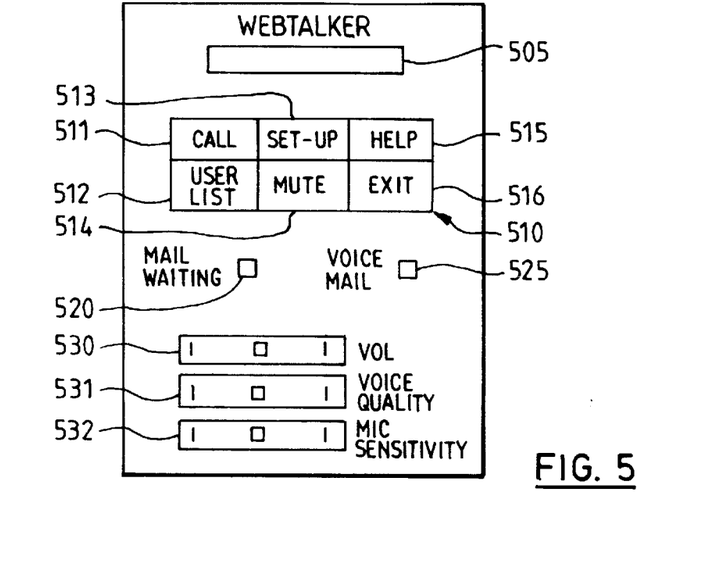
FIG. 5 illustrates the user interface presented by the Internet telephone system of FIG. 3.

In order to operate as an Internet telephone, the computer system of FIG. 3 must contain appropriate application software. In the preferred embodiment, this application software is called WebTalker, and provides a user interface as shown in FIG. 5. This interface includes message panel 505, which can be used to pass status messages to the user (eg "dialling", "engaged", etc), and a set of control buttons 510. The Call button 511 allows a call to be made to a named individual, whilst the User List button 512 provides access to a server directory (see below), as well as to a listing of people who have been called previously (or from whom calls have been received). Clicking on the name of a desired individual from one of these lists results in a call being made to the corresponding email address for that individual. The remaining control buttons, Set-Up 513, Help 515, Mute 514 and Exit 516 are substantially self-explanatory, and will not be described further since they are not directly relevant to an understanding of the present invention.

The window also contains slider bars, which can be used to control Volume 530, Voice Quality 531, and Microphone Sensitivity 532. It will be appreciated that it is possible to improve voice quality for example by reducing the degree of compression, or by increasing the amount of buffering at the receiving end, although these will tend to lead to increased delays. Finally, the window contains Mail Waiting light 520 and Voice Mail light 525, which will be explained in more detail below.

The operation of the Webtalker telephone is as follows (see FIG. 6). When the user starts up the Webtalker software telephone client 620 on the Internet 600, the telephone logs onto a server 650 on the Internet. There may be multiple possible servers, but a default one is chosen in accordance with the set-up parameters of the Internet telephone. It will be appreciated that this requires the Web telephone to use standard Internet communications facilities, as wellknown in the art.

The server maintains a list of people currently logged on to the Internet and using Webtalker. This list is accessible to the user (via the User List control button), allowing the user to select another party to call. The called party then receives notification of their incoming call in their control window 505, plus a pop-up box asking them whether or not they wish to accept the call. Assuming the call is accepted, then this establishes a direct link between the two clients (ie the two Internet telephones) independent of the server. This link provides a TCP/IP control channel and a UDP data channel. The two clients can start audio communications, using their audio subsystems as described above. Thus the audio data from each client is processed into a compressed form, and then transmitted over the UDP data channel to the other client. The audio communications can either be full duplex, or, to save bandwidth, half duplex.

In practice although the audio quality across the network is acceptable, the end to end delay Internet may be a couple of seconds or more, which means that completely natural conversation is not possible. Thus it can become confusing if one party tries to interrupt another, or does not clearly indicate when he or she finishes speaking. However, once a user is accustomed to these limitations, then an Internet telephone conversation becomes a very valuable method of communication.

As so far described, the WebTalker application has substantially the same function as known Internet telephones, and so its operation will be well understood by the skilled person. However, in accordance with the present invention, the WebTalker telephone includes the additional facility of allowing a voice message to be left when the called party is not logged onto the Internet. This is to be contrasted with the situation with known Internet telephones, which at the called end provide a voice mail message when the called party is logged onto the network, but chooses not to answer an incoming call. As explained previously, most users, particularly those at home, do log-off from the Internet when not specifically using it to avoid paying unnecessary connection charges.

There can be several reasons why a call might be made to a party who is not currently logged on. One possibility is for the server list to be in error, perhaps because of a recent failure in the network, which has not yet been reflected in the list. Another possibility is that a caller exited abnormally from the Webtalker application (eg they crashed out), and so did not trigger the normal log off procedure at shut-down (normally the server would eventually time out with respect to these terminals, and eventually log them off anyway). Another possibility is that the call is made using the Call button 511, with the address of the called party directly entered, therefore by-passing the server list of users currently logged on (not all Internet telephones enable this).

Figure 6:
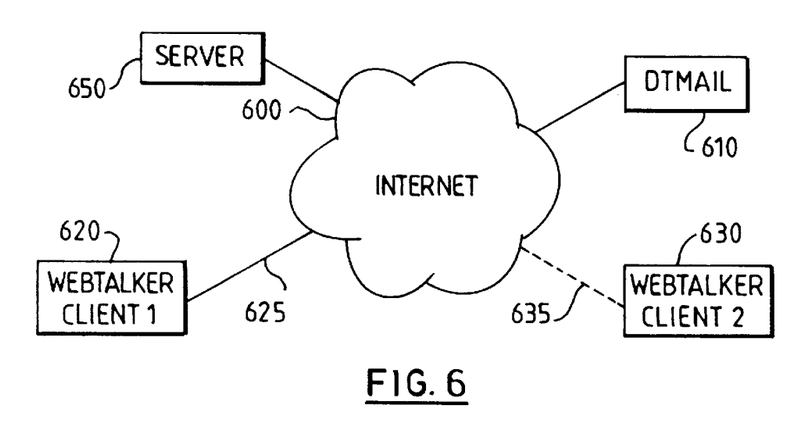
FIG. 6 is a schematic diagram of two Internet telephone systems and a voice mail system connected by the Internet.

FIG. 6 illustrates the situation where client 1 has a first WebTalker telephone 620, connected to the Internet 600 typically via a modem and telephone line 625. Likewise client 2 has a WebTalker telephone 630, and a similar dial-up connection 635 to the Internet. However, client 2 is not currently logged onto the Internet, so this connection is shown in a dashed line.

At this point, when client 1 tries unsuccessfully to make a call to client 2, the WebTalker telephone of client 1 provides a status message indicating that the call could not be made because client 2 is not currently logged onto the network. Further, the WebTalker telephone invites client 1 to leave a voice mail message for client 2. Assuming that client 1 does opt to leave a voice mail message, then the WebTalker telephone dials up the voice mail system 610 in exactly the same manner as dialling any other WebTalker telephone on the Internet.

In the preferred embodiment, the option of sending voice mail is therefore controlled by the calling Internet telephone without reference to the server. However, as an alternative, the server may be involved. For example, in addition to presenting a list of users currently logged on, the server may present an additional list of callers for whom voice messages can be left. Selecting a caller from this list results in a call being made to the voice mail system, in the same manner that selecting a currently logged on user results in a call to that user. In such circumstances, it may in fact be desirable for the voice mail system itself to log onto the server.

In general, the voice mail system 610 will have the capability to handle many lines of incoming traffic, and have a permanent connection into the Internet. The voice mail system 610 will typically be managed by a service provider. Client 2 may pay a subscription for this service, or it might perhaps be included free with an Internet access package, or telephone line rental, in order to encourage usage. Similarly, an organisation marketing Internet telephones might offer the voice mail service to attract users to their particular offering. Alternatively, a company might provide the voice mail system 610 for all its employees.

It is assumed that client 1 was informed of the Internet address of the voice mail system 610 for client 2 at the same time that it learned of the Internet address of client 2, and that these have been stored together in a directory on client 1. It may also be possible for client 1 to interrogate the server 650 to find out the address of the voice mail system for client 2; or as suggested above, the connection may in fact be initiated through the server. Alternatively it may be that all subscribers to the WebTalker Internet telephone may use the same voice mail service. However, in the event that the WebTalker telephone is unable to determine the address of the voice mail system for client 2, then an appropriate error message is supplied to client 1.

Figure 7:
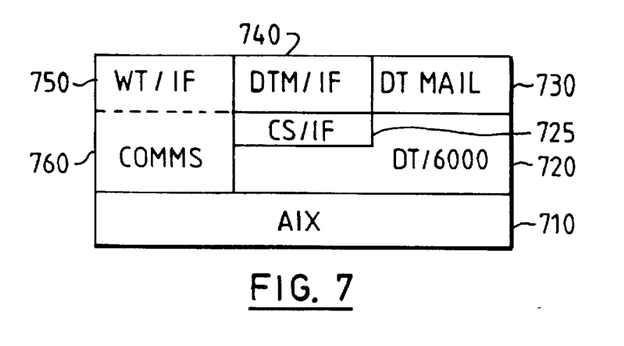
FIG. 7 is a schematic diagram of the enhancements made to the voice mail system software, compared with that shown in FIG. 2, in order to receive voice messages over the Internet in accordance with the present invention.

FIG. 7 illustrates the enhancements necessary to the voice mail system 610 in order to allow it to receive calls from the WebTalker telephone. As shown previously in FIG. 2, the DirectTalkMail system 730 is essentially an application running on top of the DirectTalk/6000 voice processing system 720, which itself is an application running on top of the AIX operating system 710 to provide recording and playout of voice segments etc. Included within the Direct-Talk voice processing system is a custom server interface 725, which allows C programs to interact directly with the DirectTalk/6000 voice database. Use of the custom server interface is required in the present instance since the voice messages are not being played out over the standard telephone interface (via the digital trunk adapter), but rather transmitted in software format over the Internet. The custom server interface is described in more detail in the manual IBM AIX DirectTalk/6000 Voice Application Development (reference SC33-1722-00).

In order for the DirectTalkMail to receive WebTalker telephone calls, appropriate software has to be provided. This software can effectively be split into two components, with an interface between them. The first component provides the WebTalker interface 750, and includes communications software 760 to allow communications over the Internet (nb some of the software necessary for this is already provided in the operating system 710, as known in the art). The WebTalker interface software 750 ensures that to a client WebTalker telephone, such as WebTalker telephone 620 (see FIG. 6), the voice mail system can appear substantially similar to another WebTalker telephone. Therefore, when the voice mail system needs to play out a prompt over the Internet, the WebTalker IF component 750 is responsible for compressing the audio, packaging it correctly, and transmitting it out over the Internet to the client system. Conversely, for incoming audio from the client system, the WebTalker IF component is responsible for decompressing, buffering, and assembling the received packets into a proper audio signal. Note that this processing may be done all in software (ie there is no need for special hardware at the voice processing system such as that shown in FIG. 4).

The DirectTalkMail interface component 740 is therefore passed incoming audio signals in PCM format from the WebTalker interface (A law, mu law, or any other suitable digital audio format could be used), and uses the DirectTalk/6000 custom server interface to store these as voice messages in the DirectTalk/6000 voice database. Similarly, the DirectTalkMail interface component uses the custom server interface to retrieve stored prompts and voice messages, converts to the appropriate format (eg PCM) and passes these over to the WebTalker interface component for compression, and transmission to the client. Each mailbox in the voice database may have an assigned Internet address, so that calls intended for a client at a particular Internet address (as specified by the information received from the WebTalker interface component) can be stored in the correct mailbox (alternatively incoming calls could be required to specify a mailbox number). It will be appreciated that in common with most voice mail systems, DirectTalkMail actually performs its own compression on voice messages prior to storage, to reduce storage requirements. The compression technique used by the voice mail system differs from that used by the WebTalker telephone system, hence the need to decompress and the recompress incoming calls (and similarly for outgoing calls), although it is certainly feasible for a voice mail system and Internet telephone to use the same compression scheme throughout.

The most basic embodiment of the present invention simply allows for the two-way transmission of audio, enabling the caller to hear a greeting or prompt, and then to leave a message. However, it will be appreciated that the DirectTalkmail system, in common with most voice mail systems, is normally controlled by a user pressing DTMF keys on their telephone to select between multiple commands or options. In order to provide this control to a client over an Internet, a facility is added to the WebTalker telephone, such that when it dials a voice mail system, a telephone keypad is presented to the user of the WebTalker telephone. By clicking on the desired button (ie digits 0–9, * or #), the user of the WebTalker telephone can transmit a control command to the voice mail system. The selected command is not transmitted as a DTMF signal, but rather as a simple message containing an identifier of the pressed key, since this requires far less bandwidth. This identifier is distinguished from normal audio data, so that it is properly recognised by the WebTalker interface component 650. The identifier is then passed to the DirectTalkMail interface, which interacts with the DirectMail and DirectTalk/6000 systems to ensure that the requested function is performed.

The two-way audio exchange between the voice mail system and the client Webtalker telephone, together with the facility for the client to send and the voice mail system to accept identifiers corresponding to DTMF tones, provide a full function voice mail service, thereby allowing (for example) client 1 to leave a voice mail message for client 2, when client 2 is not logged onto the Internet to personally receive a telephone call. It will be appreciated that voice mail system 610 can typically accept many incoming calls simultaneously. Indeed, unlike conventional operation of a voice mail system, which is limited by a predetermined number of telephone ports, there is not necessarily any hard limit on the number of software Internet calls which can be handled at the same time (rather, as the number of calls increase, performance will eventually start to degrade, due to the finite processing power available at the voice mail system, or the limited bandwidth of the voice mail Internet connection, or both).

Once a voice mail message has been stored within the voice mail system 610, then there are several possible mechanisms for retrieving it. Firstly, the message can be retrieved in conventional fashion over the normal telephone network. Thus the user simply dials the telephone number associated with the voice mail system, and can then access any messages they have by responding to appropriate prompts, and (generally) entering a password.

Another possibility is that the message can be retrieved over the Internet using a Web browser with audio capability. This can be implemented by having the voice mail system act as a WWW site, with universal resource locators pointing to a user mailbox, and the mail messages within. This approach is described in more detail in PCT application PCT/GB95/02009, and is also provided by the currently available release of the DirectTalk/6000 and DirectTalkMail products (see the manual IBM AIX DirectTalkMail Administration, reference SC33-1733-00). As a slight variation on the approach described therein, once a message has been selected, the Web browser may also provide the option of having this message delivered to the user's Internet telephone system (which will generally be running on the same machine as the browser). It may be advantageous to have the Internet telephone system play the message (rather than the browser itself), for example because the former allows the message to be subsequently forwarded, or will allow the caller's address to be stored in the user's directory.

The preferred embodiment provides another possibility, that of accessing the stored voice mail message from a WebTalker telephone. Thus as part of its start-up procedure, the WebTalker telephone interrogates the voice mail system associated with that client (this can be specified as part of the set-up procedure). The Webtalker telephone client therefore sends a query to the voice mail system, which is received by the WebTalker interface component and passed into the DirectTalkMail system. The DirectTalkMail system then identifies the mailbox corresponding to the specified Internet address for that client, and returns an indication of whether or not there are any new messages for that user. This indication is returned by the WebTalker interface component to the requesting WebTalker telephone, and if positive, the message waiting indicator on the WebTalker telephone client screen is activated (eg by highlighting or making a different colour).

In order to access the voice messages, the client Internet telephone then places a call over the Internet to the voice mail system. This is done by simply pressing the voice mail button, which automatically dials the default voice mail system for that client. This establishes a two-way audio call between the client Internet telephone and the voice mail system. The call can now proceed in analogous fashion to that described above for entering a voice message into the system. Again, the voice mail system plays various prompts to the user, who is provided with a simulated DTMF keypad on his or her screen. The user selects the desired button, and can navigate through the voice mail system, including typically some password protection, to obtain access to their voice mail, which can then be played out to them over the Internet. Thus the user can have immediate access to their voice mail, either via the conventional telephone network, or from any location on the Internet.

It will be appreciated that many variations on the above approach are possible. For example, instead of using a simulated DTMF keypad for inputting control commands, it may be possible to include a voice recognition facility with the voice mail system to allow a client to simply speak his or her desired choice. Another possibility is for all prompts from the voice mail system to be available for transmission in text form to a client, and displayed there textually or graphically, eg perhaps using a menu structure, thereby significantly reducing bandwidth requirements and overall delay. It is also possible for DirectTalkMail to exploit the enhanced user interface of the client (compared to a conventional telephone) to provide information in a more convenient format to the client. For example, rather than asking a user to "Press 1 to hear messages" (say), the system might simply display the command "Listen to messages", with associated button. Selecting this button would then result in the voice mail system taking the same action as if a "1" had been pressed on a conventional telephone. The enhanced capabilities of the screen interface may be further exploited to provide the user with features that are not directly available when calling from a conventional telephone. For example, the voice mail system could send a text list of stored messages, together with information such as the sender of the message, to allow a user to immediately assess all his or her outstanding messages (nb this is the approach taken with the voice mail Web browser access described above).

It will be appreciated that although the systems described so far transmit telephone calls entirely over the Internet, for some Internet telephone systems it is in fact possible to make hybrid telephone calls. In these cases the originating or destination telephone may in fact be a conventional telephone, with one or more servers acting as interface units between the Internet and the conventional telephone network (indeed, the voice mail system itself may possibly be so connected). As used herein, the term "Internet telephone" is generally meant to cover such systems, and references to transmission over the Internet may include transmission over the conventional telephone network along some of the route.

It is possible for the voice mail service described above to be invoked not only when the called party is not logged onto the Internet, but even when they are logged on, but unable or unwilling to accept the call at the time that it is received. This would avoid the need for an Internet telephone to provide a local voice mail service. In this case, the Internet telephone, in refusing to accept a call, could transmit back to the calling party the Internet address of its preferred voice mail system.

There are also many possibilities for the action to be taken by the voice mail system on receipt of an incoming voice message. For example, it might try to page the intended recipient, or possibly place a telephone call through to them at a previously indicated location. Another possibility is to send an email notification to them, to be read next time they log on to the Internet.

It will be recognised that one of the drawbacks with current Internet telephones is that systems from different vendors are generally incompatible with one another. Although efforts are being made to provide standardisation, it will be noted that the voice mail system of the present invention may easily be adapted to support multiple formats. The simplest way of achieving this is to have software which is the equivalent of the WebTalker interface 750 and communications layer 760 for each different telephone format, with incoming/outgoing calls being identified and passed to the correct interface software.

An important aspect of the invention is that allows a subscriber to maintain a single voice mailbox, accessible either over the Internet, or the conventional telephone network. Thus a user has only a single greeting response to maintain (eg to inform callers if the user is eg in a meeting, away on vacation, or whatever). Furthermore, voice mail messages may be treated in exactly the same manner, whether received over the Internet or conventional telephone network, and whether accessed and retrieved via the Internet or the conventional telephone network. For example, when a user may notified of the number or existence of new or stored messages, without any distinction as to the origin receipt mechanism of the messages. The voice mail system of the invention therefore offers the user greater power and flexibility, without any corresponding increase in complexity.

What is claimed is:

1. A method of providing voice mail on the Internet comprising the steps of:
   selecting to make a call over the Internet from a first user at a first Internet telephone system to a second user at a second Internet telephone system;
   determining that said second Internet telephone system is not currently logged onto the Internet to receive said call;
   responsive to such determination, establishing a call over the Internet from the first user at the first Internet telephone to a voice mail system distinct from said second Internet telephone system; and
   transmitting from said first user as part of said established call a voice message for said second user over the Internet to said voice mail system for subsequent retrieval by said second user.

2. The method of claim 1, wherein responsive to a determination that the second Internet telephone system is not currently logged onto the Internet, the first user at the first Internet telephone system is offered a choice of whether or not to leave a voice message for the second user.

3. The method of claim 1, wherein said call is established over a communications link that permits two-way communications, and the voice mail system transmits to the first user one or more prompts or greetings prior to transmission of the message for the second user to the voice mail system.

4. The method of claim 3, wherein said one or more prompts or greetings include information concerning the current location and availability of the second user.

5. The method of claim 3, wherein said information concerning the current location and availability of the second user is also heard if the voice mail system is accessed by the conventional telephone network.

6. The method of claim 1, wherein said voice message can be retrieved by the second user either using an Internet telephone over the Internet, or by using a conventional telephone over the conventional phone network.

7. The method of claim 1, wherein said second user needs to supply a password to the voice mail system prior to retrieval of said voice message.

8. The method of claim 1, further comprising the step of the voice mail system providing said second user of said second Internet telephone with an indication that he or she has a voice mail message waiting next time said second user logs on to the Internet using an Internet telephone.

9. The method of claim 8, wherein said indication is provided in response to a request from the Internet telephone, which is transmitted from the Internet telephone to the voice mail system at start-up time.

10. The method of claim 8 or 9, wherein said indication is provided irrespective of whether said voice mail message was received over the Internet or over the conventional telephone network.

11. A telephone system for making a telephone call over the Internet, including:
   means for allowing a first user at said system to select a second user at a second Internet telephone system to call over the Internet;
   means for determining that said second Internet telephone system is not currently logged onto the Internet to receive said call;
   means, responsive to such determination, for establishing a call over the Internet from the first user at the first Internet telephone to a voice mail system distinct from said second Internet telephone system; and
   means for transmitting from said first user as part of said established call a voice message for said second user over the Internet to said voice mail system for subsequent retrieval by said second user.

12. The telephone system of claim 11, further including means responsive to a determination that the second Internet telephone system is not currently logged onto the Internet, for offering the first user the option of leaving a voice message for the second user.

13. The telephone system of claim 11, wherein said call is established over a communications link that permits two-way communications to allow said first user to receive one or more prompts or greetings prior to transmission of the message for the second user.

14. The telephone system of any of claims 11 to 13, further including means for receiving from the voice mail system information that said first user has one or more new messages in the voice mail system, and means for providing a visual indication accordingly to said first user.

15. The telephone system of claim 14, further including means responsive to the start-up of said telephone system for sending a request to the voice mail system in order to receive said information whether the first user has one or more new messages.

16. The telephone system of claim 13, further including means for displaying one or more prompts or greetings to said first user in textual or graphical form.

17. A voice mail system including:
   means for receiving a voice message over the Internet;
   means for storing said voice message;
   means for allowing said message to be retrieved over the Internet;
   means for allowing said message to be retrieved over the conventional telephone network;
   means for transmitting one or more prompts or greetings prior to receipt or retrieval of a voice message over the Internet;
   wherein said one or more prompts or greetings transmitted prior to receipt of a voice message over the Internet include information concerning the current location and availability of the second user.

18. A voice mail system including:
   means for receiving a voice message over the Internet;
   means for storing said voice message;
   means for allowing said message to be retrieved over the Internet; and
   means for allowing said message to be retrieved over the conventional telephone network;
   wherein said means for receiving a voice message over the Internet includes means for receiving a voice signal in compressed form split into a plurality of packets, and means for assembling the voice signal and decompressing it into said voice message.

19. A voice mail system including:
   means for receiving a voice message over the Internet;
   means for storing said voice message;
   means for allowing said message to be retrieved over the Internet; and
   means for allowing said message to be retrieved over the conventional telephone network;

wherein said means for allowing a voice message to be retrieved over the Internet includes means for compressing the message and packetising it prior to transmission over the Internet.

20. A voice mail system including:

means for receiving a voice message over the Internet;

means for storing said voice message;

means for allowing said message to be retrieved over the Internet;

means for allowing said message to be retrieved over the conventional telephone network; and means for providing an indication to a subscriber that he or she has one or more voice mail messages waiting;

wherein said indication includes both voice messages received over the Internet, and voice messages received over the conventional telephone network.

21. The voice mail system of claim 20, wherein said indication is provided to a subscriber using an Internet telephone system in response to a query received over the Internet from said system.

* * * * *

UNITED STATES PATENT AND TRADEMARK OFFICE
CERTIFICATE OF CORRECTION

| | | |
|---|---|---|
| PATENT NO. | : 6,282,269 B1 | Page 1 of 1 |
| APPLICATION NO. | : 08/763156 | |
| DATED | : August 28, 2001 | |
| INVENTOR(S) | : Ronald John Bowater and Lawrence Leon Porter | |

It is certified that error appears in the above-identified patent and that said Letters Patent is hereby corrected as shown below:

Column 13 line 10, please change "Intemet" to "Internet".

Signed and Sealed this

Thirty-first Day of March, 2009

JOHN DOLL
*Acting Director of the United States Patent and Trademark Office*